Nov. 8, 1966 W. L. ROTH 3,284,359
BARIUM POTASSIUM FERRITE MAGNETIC MATERIAL EXHIBITING NON-VANISHING ROTATIONAL HYSTERESIS IN APPLIED MAGNETIC FIELDS
Filed Dec. 26, 1963
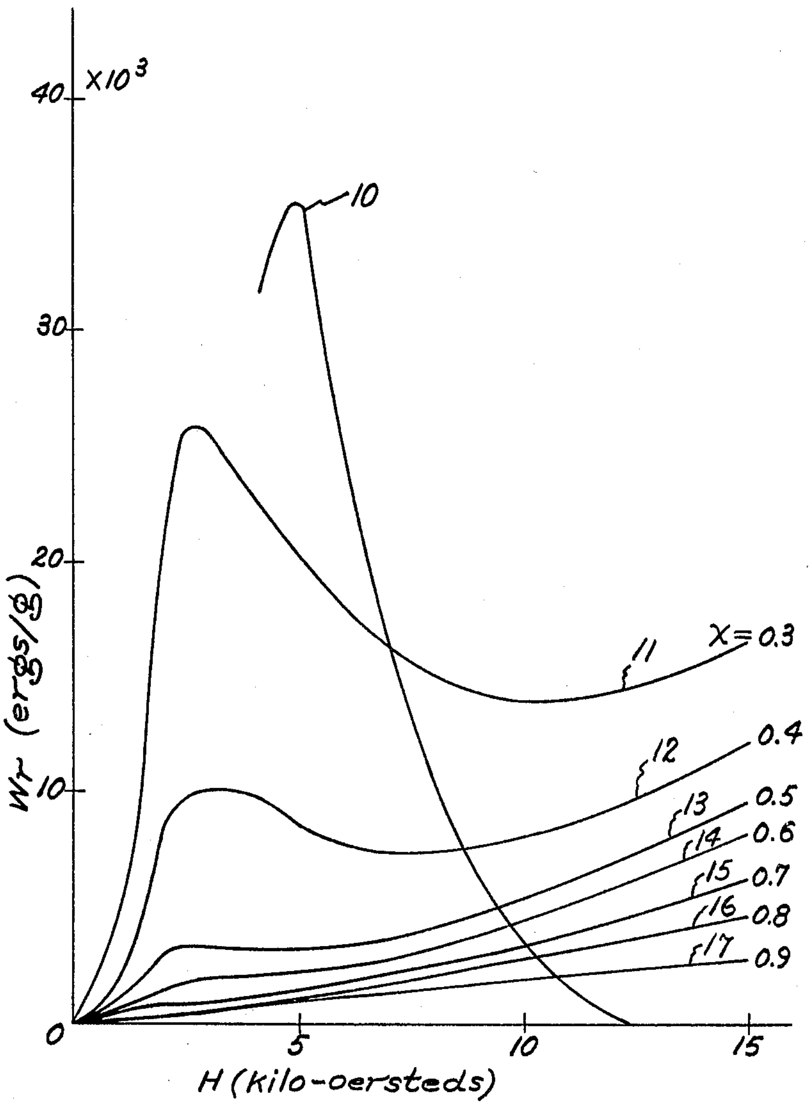
Inventor:
Walter L. Roth,
by Richard C. Speer
His Attorney.

United States Patent Office 3,284,359
Patented Nov. 8, 1966

3,284,359

BARIUM POTASSIUM FERRITE MAGNETIC MATERIAL EXHIBITING NON-VANISHING ROTATIONAL HYSTERESIS IN APPLIED MAGNETIC FIELDS

Walter L. Roth, Schenectady, N.Y., assignor to General Electric Company, a corporation of New York
Filed Dec. 26, 1963, Ser. No. 333,348
2 Claims. (Cl. 252—62.5)

This invention relates to magnetic materials exhibiting non-vanishing rotational hysteresis in an applied magnetic field and more particularly to such materials that exhibit non-vanishing rotational hysteresis at room temperature and higher. Magnetic annealing of these materials produces materials which exhibit unidirectional anisotropy in high magnetic fields and at high temperature.

Previously known magnetic materials have exhibited a characteristic behavior when rotated in a unidirectional magnetic field which has generally been referred to as rotational hysteresis. This may be described in the following manner. Assume a body of conventional magnetic material is supported in a unidirectional magnetic field and adapted to be rotated about an axis passing through the body normal to the direction of the field. As the body is rotated about this axis, the direction of magnetic polarization of the body will attempt to remain parallel to the direction of the applied field. If the strength of the applied magnetic field is low, the direction of the polarization of the material shifts very little and with no discontinuous motion which gives rise to loss. As the strength of the applied magnetic field is increased the direction of polarization of the material changes its direction discontinuously during the course of its rotation, producing loss and a peak value of rotational hysteresis. Then as the field is further increased, the polarization of the material follows the field closely with no discontinuous motion and therefore no loss. A typical rotational hysteresis curve for a conventional magnetic material is illustrated by curve 10 in the figure of the drawings.

As is well known, in certain electrical apparatus which involve the rotation of magnetic materials in applied magnetic fields for their operation, such as for example so-called hysteresis motors, the attainment of high hysteresis losses is limited to the relatively narrow value of the applied field which corresponds to the peak on the rotational hysteresis curve for the particular magnetic material involved. A magnetic material having a relatively high, non-diminishing rotational hysteresis loss for higher employed magnetic fields would be desirable for such apparatus.

It is, therefore, a principal object of this invention to provide a magnetic material which has substantially constant or non-diminishing value of rotational hysteresis losses under high magnetic fields, which material can have a single preferential direction of magnetic polarization.

Other objects and advantages of this invention are in part obvious and in part explained by reference to the accompanying specification and drawing.

In the drawing, the figure is a graphical representation of the rotational hysteresis characteristics of the material of this invention and of a conventional magnetic material.

Briefly stated, in accordance with this invention there are provided magnetic materials which consist of fired mixtures having compositions according to the formula: $A_{1-x} \cdot B_x$. In this formula, B is an antiferromagnetic potassium ferrite from the group consisting of $K_2O \cdot 11Fe_2O_3$ and $K_2O \cdot 7Fe_2O_3$, while A represents a ferrimagnetic material selected from the group consisting of $PbFe_{12}O_{19}$ and $BaFe_{12}O_{19}$. The value of $x$ ranges from greater than zero to less than one.

The magnetic exchange anisotropy found in ferromagnetic-antiferromagnetic systems, such as cobalt-cobaltous oxide and that found in ferrimagnetic-antiferromagnetic systems has been known for many years. However, in most of these known systems the exchange anisotropy is found only at extremely low temperatures, for example approximating 78° K. and lower, and in no instance has it been possible to produce magnetic materials which exhibit the magnetically anisotropic properties characteristic of magnetic exchange interactions at high temperatures.

The magnetic compositions of this invention, as already mentioned, are fired mixtures of one of the ferrimagnetic materials, lead ferrite ($PbFe_{12}O_{19}$) or barium ferrite ($BaFe_{12}O_{19}$) with antiferromagnetic potassium ferrite ($K_2O \cdot 11Fe_2O_3$ or $K_2O \cdot 7Fe_2O_3$). These ingredients are combined in amounts according to the formula $A_{1-x}—B_x$, where B represents the antiferromagnet, A represents the ferrimagnet, and $x$ has a numerical value less than one and greater than zero.

Composition preparation may be accomplished by preparing mixtures of lead or barium carbonate ($PbCO_3$ and $BaCO_3$) with $Fe_2O_3$ and potassium nitrate ($KNO_3$) and prefiring the mixtures at 500° C. to 900° C. The presintered mass is then ground to pass a 100 mesh screen, pressed into pellets of desired size and, finally, fired in an oxygen atmosphere at temperatures of from about 900° C. to 1400° C. to obtain the final product. The time of final firing is not important so long as it is adequate to assure that complete reaction has taken place between the individual components. Generally, times on the order of two hours are suitable, although time will necessarily vary due to such things as specimen size.

Sample compositions were prepared according to the procedures just outlined. Specifically, reagent grade $KNO_3$, $PbCO_3$, $BaCO_3$ and $Fe_2O_3$ were mixed to give the composition $A_{-x}—B_x$ with $0<x<1$, A representing lead and barium and B representing potassium. These mixtures of powders were presintered, ball-milled under alcohol, dried, screened to −100 mesh, pressed into bars and disks at 10,000 pounds per square inch and, finally, sintered in oxygen. Approximately 50 percent excess $KNO_3$ and 30 percent excess $PbCO_3$ and $BaCO_3$ were used in the original mixtures to prevent the retention of $Fe_2O_3$ in the final samples.

Curves 11–17 of the figure of the drawings indicate the rotational hysteresis of compositions of this invention in which barium was used as the ferrimagnetic component and is present in amounts ranging from 30 to 90 percent. The rotational hysteresis indicated by curve 10 of the drawings is that for a conventional magnetic material and it is apparent that as the applied field is increased, the torque drops precipitously from a very high level to zero. On the other hand, the materials of curves 11–17 show that when the antiferromagnetic component potassium is present that a non-diminishing rotational hysteresis is obtained. The addition of potassium had a pronounced effect and in every composition containing it the torque ($W_r$) persists to large fields and in fact was still increasing with increasing field strength. For the larger amounts of potassium, the rotational hysteresis increased approximately linearly with the applied field whereas at intermediate compositions the curves display a maximum near 3000 oersteds.

A unique characteristic of these materials is that after magnetically annealing they can exhibit asymmetric hysteresis loops which are substantially displaced on the H-axis at room temperature and higher. When producing materials exhibiting this magnetic asymmetry, the bodies should be fired at no higher than about 1350° C., and preferably should be fired at from about 1100° C.–1300 C. Further, if lead is used as the ferromagnetic component, then the material must be ground, after being fired, and then fired a second time. If this is not done, then the shifted hysteresis loop cannot usually be obtained. The magnetic annealing is accomplished by heating the materials to about 470° C. or higher, and then cooling in a magnetic field of about 5000 oersteds. If the composition parameter $x$ is greater than about 0.4 and less than one, the coercive forces in the forward and reverse directions will be different, where the directions are defined as parallel or antiparallel to the direction of applied field during annealing. For example, for the potassium-barium composition of those mentioned previously with $x=0.5$ fired at 1200° C., the forward coercive force $H_c^+$ was 700 oersteds and the reverse $H_c^-$ was zero.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What I claim as new and desire to secure by Letters Patent of the United States is:

1. A magnetic material possessing non-vanishing rotational hysteresis in an applied magnetic field; said material consisting of a fired mixture having a composition according to the formula:

$$A_{1-x} \cdot B_x$$

where: A is a ferrimagnet selected from the group consisting of $PbFe_{12}O_{19}$ and $BaFe_{12}O_{19}$; B is an antiferromagnetic potassium ferrite from the group consisting of $K_2O \cdot 11Fe_2O_3$; and $K_2O \cdot 7Fe_2O_3$; and $x$ is greater than zero and less than one.

2. A magnetic material as defined in claim 1 wherein $x$ is less than one and not less than 0.4.

References Cited by the Examiner

UNITED STATES PATENTS 2,783,207 2/1957 Tombs ______________ 252—62.5

TOBIAS E. LEVOW, *Primary Examiner.*

R. D. EDMONDS, *Assistant Examiner.*